United States Patent [19]

Nakagawa et al.

[11] Patent Number: 4,776,885
[45] Date of Patent: Oct. 11, 1988

[54] SINTERED COMPOSITE MATERIALS WITH SHORT METAL FIBERS AS MATRIX

[75] Inventors: Takeo Nakagawa, No. 223-4, Ichinotsubo, Nakahara-ku, Kawaski-shi, Kanagawa-ken; Kiyoshi Suzuki, Kanagawa; Kenzo Hanawa, Tokyo, all of Japan

[73] Assignees: Takeo Nakagawa, Kanagawa; Shinsin International Development Corporation, Aichi, both of Japan

[21] Appl. No.: 47,020

[22] Filed: May 5, 1987

Related U.S. Application Data

[63] Continuation of Ser. No. 709,028, Feb. 6, 1985, abandoned.

[30] Foreign Application Priority Data

Jun. 20, 1983 [JP] Japan .................................. 58-100495

[51] Int. Cl.⁴ .............................. B22F 3/10; B22F 3/14
[52] U.S. Cl. ........................................ 75/229; 75/231; 75/243; 29/149.5 NM; 252/12.4; 384/279; 384/902; 384/912; 428/549
[58] Field of Search ........... 75/229, 231, 243, DIG. 1, 75/; 428/549; 29/149.5 NM; 252/12.4; 384/279, 902, 912

[56] References Cited

U.S. PATENT DOCUMENTS 3,114,197 12/1963 DuBois et al. .................... 75/229

Primary Examiner—James C. Cannon
Attorney, Agent, or Firm—Michael J. Striker

[57] ABSTRACT

Short, fine fibers having certain aspect ratios and generally triangular cross-section are mixed with particulate material whereby the fibers form a three dimensional network and the mixture is sintered to provide composites containing scattered and enveloped particulate material, which composites have utility as self-lubricating materials or grinding materials.

7 Claims, 3 Drawing Sheets

FIG_1
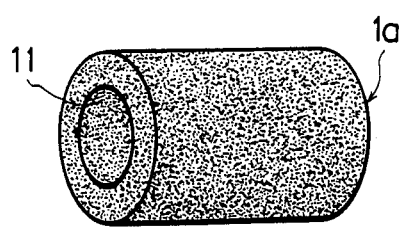
FIG_2
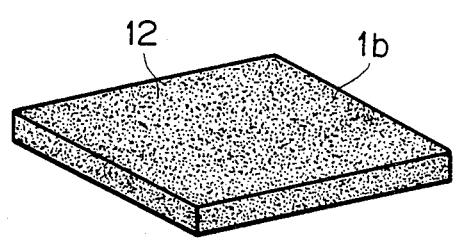
FIG_3
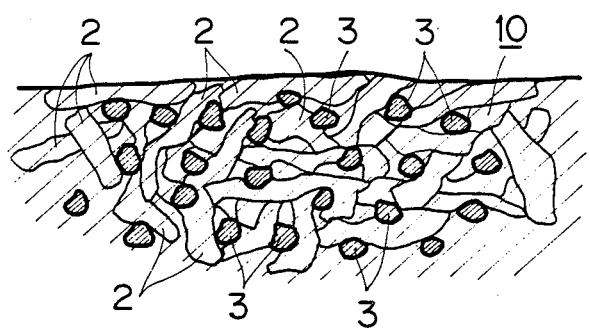
FIG_5
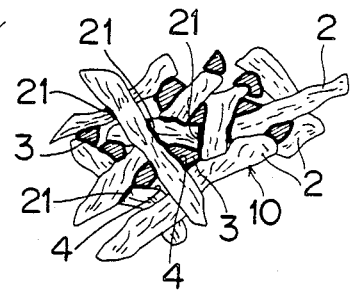
FIG_4
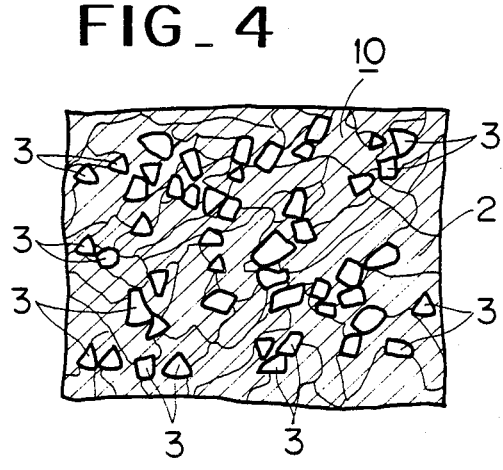
FIG_6
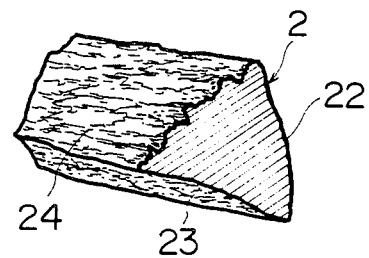

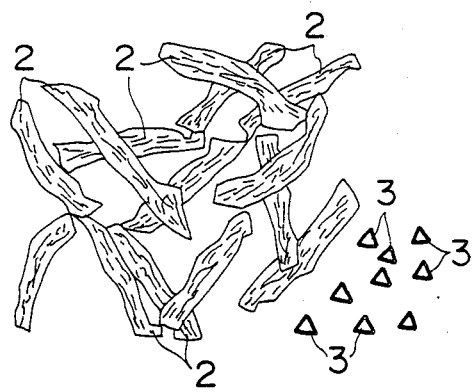
FIG_7
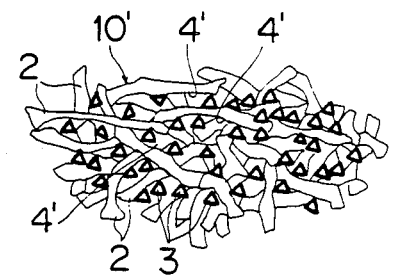
FIG_8
FIG_9
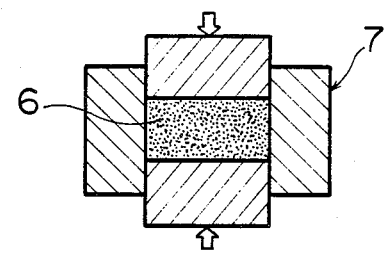
FIG_10
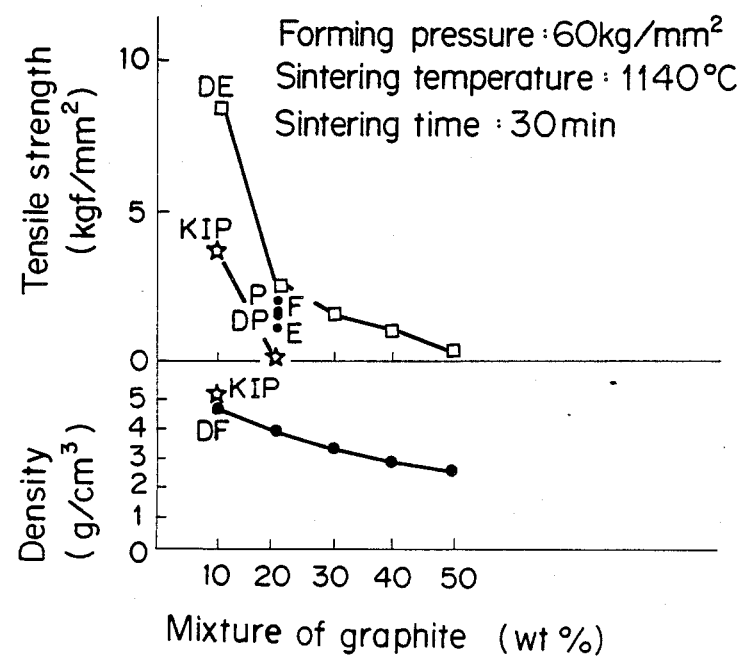

FIG_11
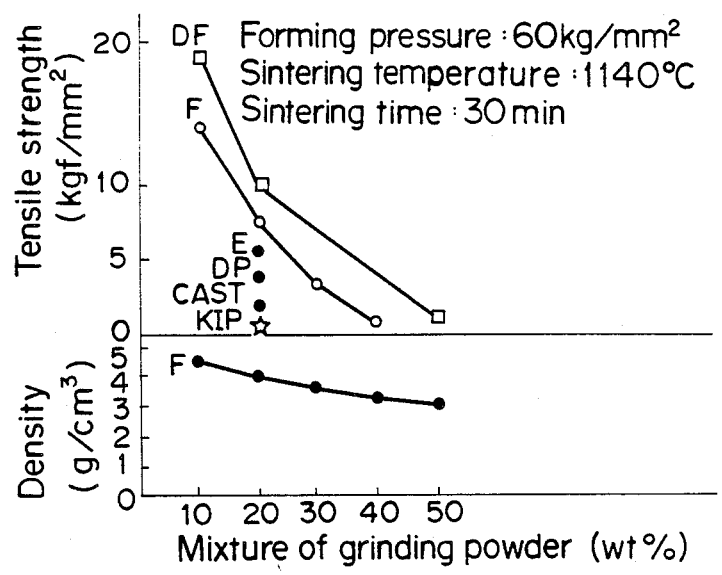
FIG_12
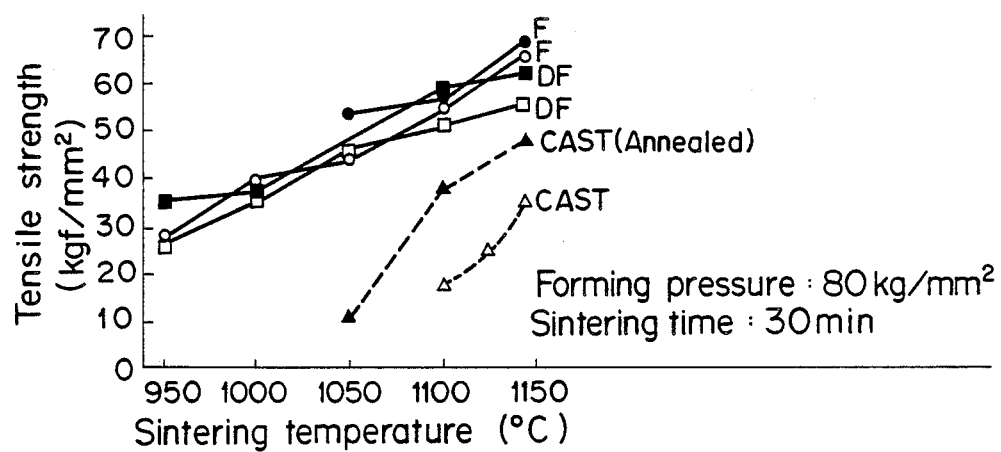
FIG_13
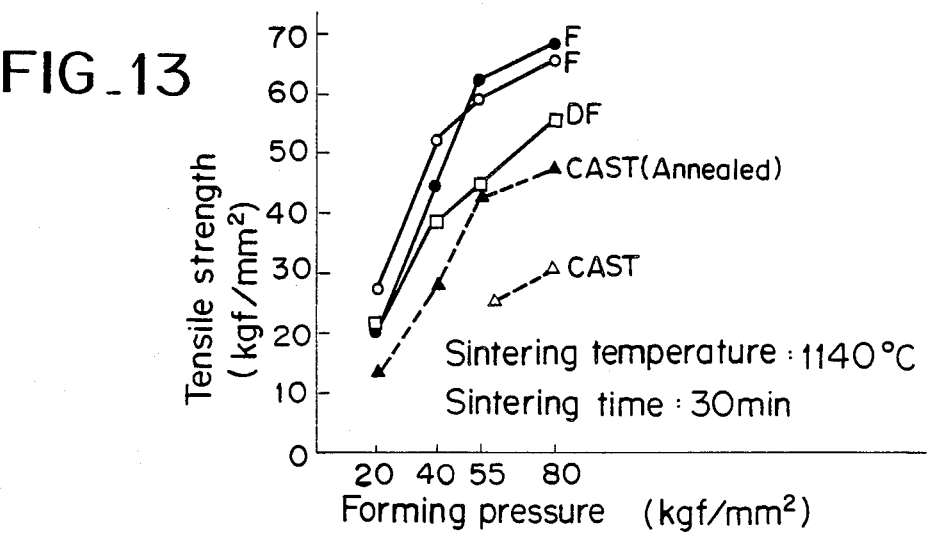

SINTERED COMPOSITE MATERIALS WITH SHORT METAL FIBERS AS MATRIX

This is a continuation of application Ser. No. 709,028, filed Feb. 6, 1985, now abandoned.

FIELD OF THE INVENTION

This invention relates to sintered composite materials, especially where short metal fibers are matrix, much containing solid lubricants, ground grains, and being excellent in mechanical properties and suitable to self-lubricant sliding materials or grinding materials.

BACKGROUND OF THE INVENTION

Composite materials where metals are mother grounds or matrixes, have been widely used in grinding or fields requiring anti-abrasion. The composite materials in those usages are required to contain as many lubricants or ground grains as possible, or to be preferable in holding those materials as well as excellent in mechanical properties such as compression strength or tensile strength. Unfortunately, conventional composite materials have never satisfied those requirements.

For example, sliding bearing is used with various kinds of machine tools, or a relative slide face of an actuation mechanism. In view of usage, each of the lubricants is selected, however, depending upon using objects or incorporating positions, the lubricant oil could not always be supplied. As a countermeasure thereto, a bearing having self-lubrication has been developed, and especially bearings have been proposed which are scattered with a solid lubricant such as carbon or molybdenum disulfide in the matrix when dispersion of oil should be avoided, and endurance is required against high compression load.

As a method of scattering solid lubricant into the matrix material, the solid lubricant of bush type is incorporated under pressure into a mother material. In this method the mother material composed of a molten-solidified material is processed with borings, into which solid lubricant independently made is buried, a limitation is inherently provided to increasing the friction coefficient due to restraint of spaces between borings, and a close lubricant face could not formed overall. In addition, it takes a great deal of manufacturing, and requires troublesome machining processes at high cost.

Further, another method is a powder metallurgical manner which scatters solid lubricants into the matrix. Conventionally, if a large quantity of the solid lubricant were contained, formability, sintering property and strength would be exceedingly lowered, and the containing maximum was 15 wt% and practically it was about 10 wt%. Therefore, the introduction system under pressure of said solid lubricant of the bush type was generally employed.

On the other hand, the grinding materials (grinders) are much used for a lapping, super finishing process or super precision finishing by grinding fine notches or slits, which heighten flattening degree of pre-processed works of hard brittle materials such as ceramics or ultra hard alloy, and in general the the ground powders such as diamond, CBN, alumina or others are binded by the binder. In the binders, there are metallic and non-metallic binders, and the former is better in the binding force than the latter and is used for binding of the ground powders of high property such as diamond or CBN.

As manufacturing processes of the grinding materials where the binder is metal as said, there are an electrodeposit process and a sintering process. However, they have problems as follows.

One of the problems is that an amount of grinding powders contained is low. The amount grinding powders contained should be as large as possible for increasing the property of the grinding material. But since the electrodeposit process firmly adheres the grinding powders to the matrix composed of the molten-solidified material by means of nickel plating, the deposited layer is the only one formed, and therefore the amount of the grinding powders contained is limited in itself. With respect to the sintering process, if a large quantity of grinding powders were contained, it would remarkably decrease uniformity of mixture (non-separation), formability and sintering property, and practically the contained amount is around 10 wt% at most.

The other problem is the dispersing property and the holding strength of the grinding powders. Those two elements are important to the grinding materials, but the foregoing processes have not satisfied them. Especially, in the sintering process, the grinding powders are not easily dispersed due to the difference in specific gravity or in grain size between the grinding powders and the ground grains. Further, since the grinding powders gather in spaces between the grains, the holding force thereof is decreased and the grinding powders easily drop out from the matrix during use. Such phenomena often happen, if the grain size of the grinding powders is small, and decrease the mechanical strength of the grinding material in addition to said unsatisfaction of the sintering property.

SUMMARY OF THE INVENTION

The present invention is to remove the disadvantages, shortcomings and other problems of the conventional composite material of the metal matrix, and is to provide a new sintered composite material containing a uniform and large quantity of powder raw substances and being excellent in the mechanical characteristics.

In other words, the invention removes the defects of the sliding material of the self-lubrication, and uniformly scatters the solid lubricant as much as 20 to 25 wt% in the matrix, and provides a practical sliding material of the self-lubrication which is satisfied with strength and possible in mass-production at economical production cost.

In addition to removing of the problems of the conventional grinding material and providing of said improvements, the invention is to provide a new practical grinding material which may reduce loss by sintering of the grinding powders such as diamond or the like.

For accomplishing the above mentioned objects, the invention includes an objective composite material of sintered material mixed and formed with powder grains and special metal fibers which are fine and short fibers produced by machining the mother metal material by self-vibration of a maching tool.

Said fine and short metal fiber is almost triangular in cross section, and the three sides comprise a flat and smooth side, a broken side and a wrinkled rough side. An aspect ratio of the fiber is within a range of 4 to 70.

Since the short fiber is lower than the grain in fluidity, it is important to determine suitable aspect ratios. If the aspect ratio is not suited, the formability and the sintering property are decreased. If the aspect ratio falls within said range, they are improved, and thereby enable accomplishment of the above mentioned objects of the invention.

The fine and short fibers form lattice structures of multi-layered net, and the poricity thereof is higher than that of the sintered grains, so that bending is easily carried out. The pores are formed of linked holes, and the powders are scattered in these pores.

The powders to be used are smaller in size than the fine and short fibers contained in the solid lubricant material and the ground grains.

The sintered composite material according to the invention is produced in that the fibers of the aspect ratio being around 4 to 70, which are produced by performing the self-vibration of the machining tool on the mother metal, are mixed with the powders of the solid lubricant material or the ground grains, and shaped into determined figures and subjected to sintering in a reducing or inert atmosphere.

BRIEF DESCRIPTION OF THE DRAWINGS

FIGS. 1 and 2 are perspective views showing sintered composite materials having matrixes of short metal fibers;

FIG. 3 is an enlarged cross sectional view showing schematically a part of a structure of FIG. 1;

FIG. 4 is an enlarged cross sectional view showing schematically a part of a structure of FIG. 2;

FIG. 5 is a partial and perspective view of FIG. 3;

FIG. 6 is a partially enlarged perspective view of a fine and short fiber of the present invention;

FIG. 7 is an enlarged perspective view of materials of the invention;

FIG. 8 is an enlarged perspective view showing mixture of composite materials;

FIG. 10 is a graph showing a relation between mixture of solid lubricant materials and tensile strength when this invention is applied to a sliding material of self-lubrication;

FIG. 11 is a graph showing a relation between mixture of ground powders and tensile strength when this application is applied to a grinding material;

FIG. 12 is a graph showing a relation between sintering temperatures and tensile strength of this invention and comparison examples; and FIG. 13 is a graph showing a relation between forming pressure and tensile strength.

DESCRIPTION OF THE PREFERRED EMBODIMENTS

Explanations will be made to embodiments of the invention in reference to the attached drawings.

FIG. 1 is one example showing a sliding material 1a of self-lubrication of fiber sintered type, which is obtained by applying the invention, and is formed in optional shapes such as sleeve, plate, disc, ring, rail and others, and which is provided with a contacting face 11 for a shaft or rod in at least one part thereof.

FIG. 2 is one example showing a grinding material of fiber sintered type, obtained by applying the invention. 1b designates the grinding material of segment shape, which is formed in optional shapes such as plate, disc, ring, pellet and others, and which is provided with a grinding face in at least one part thereof.

FIG. 3 shows an enlargement of the cross section of the sliding material 1a of FIG. 1, while FIG. 4 shows an enlargement of the cross section of the grinding material 1b of FIG. 2, and each of them is composed of a sintered mixture of the fine and short fibers 2 and the ground powders. That is, lattice structures comprise three dimentional sintered multi-nets composed of many fine and short fibers 2, and powder grains 3 are scattered into the lattice structure. More particularly, as seen in FIG. 5, many fibers 2 are combined by melting and adhering at contacting faces 21, and united into one body, and the powder grains 3 are enveloped in linked holes 4 formed by entangling and adhering the fibers. Thus, the lattice structure is formed by this action.

The fine and short metal fibers of the invention are produced by directly machining the mother material by the self-vibration of the machining tool, having an aspect ratio between 4 and 70.

The mother metal material is optional in response to the using objects, such as ferrous metals mainly as the cast iron, cupper alloy as brass or bronze, aluminium alloy as duralumin, and others. With respect to the powder grains 3, the sliding material is the solid ones such as graphite (scale or lump) or molybdenum disulfide, and the grinding material is diamond, alumina (WA) or cubic nitride boron. These powder grains are smaller than the fiber in size.

If the metal powders are used as the matrix, and since they are almost ball shaped (grain), a high pressure is required for forming, and in addition, if the pressure is the minimum within the formable range for forming the powders under pressure in the metal mold, the porocity of the body to be formed is low. Therefore, if the forming is performed with a large quantity of powders, the powders encircle grains of the matrix, so that contacting of the grains is arrested. Since a big difference in the specific gravity is present between the powder and grain, they are easily separated when charging into the metal mold, and segregation is easily caused.

For such a reason, this invention employs the fine and short metal fibers. However, if the fibers were machined dusts, they would be made round by contacting one another during reducing to powders and not uniform in size and physical properties and thus desired objects could not be accomplished.

It is assumed to cut and use ultra fine wire obtained by a multi-step drawing process, but suitable fine wires are very expensive, and it is difficult to uniformly cut the wires at desired length. Those which are obtained by cutting lengthy fibers through a machining process as represented in the steel wool, are irregular in size of thickness or physical properties, and have undesirable surface properties. Especially, since notches are generated in right angle direction with respect to the length of the fiber, the fiber is easily broken. The short fibers produced through this process considerably reduce the characteristics as formability or sintering properties.

The inventors made studies and experiments and found that as the fine and short fibers for matrix of the sliding material and the grinding material, specific fibers produced by machining the mother material via the self-vibration of the tool, were useful.

The fine and short fibers are produced by machining the mother material of metal block of a column shape, as the mother material is rotated, and an elastic tool having high natural vibration number is applied to the surface thereof, while a determined fine feed is given to the elastic material, whereby the self-vibration is positively generated in the elastic tool only, so that the surface of the mother material is forcibly divided into fibers per one cycle of the self-vibration. Otherwise the mother material may be made stationary and the elastic material is rotated therearound.

Depending upon the above mentioned process, such fibers of uniform size and physical properties are produced, having piece number in response to the vibration number and length in response to the cutting depth. The fibers reveal higher strength than the mother material due to work hardening, and since the axial line of the fiber is right angled with the cutting direction, unnecessary notches are not generated. Since the fiber is produced from the mother material in the dry process, the connecting activity of the fiber surface is high and oxidation and foreigners are little on the surface. Its cross section is, as seen in FIG. 6, almost triangular, comprising a flat and smooth face 22, a broken face 23, and a wrinkled and rough face 24, and having a large surface area and preferable scattering due to said flat and smooth face 22.

It does not satisfy the required conditions to merely use the fibers by the self-vibration machining. Because, since the fluidity of the fibers is lower than that of the powders, a problem occurs at charging the fibers into the metal mold, and fiber balls are made, or the fibers are separated from the grain body 3 such as the solid lubricant material or the grinding grains. If the size of the fiber were reduced in order to avoid said phenomena, the fibers would become flours and it is difficult to provide the strength and much contain the fibers.

In accordance with the inventors' studies, said aspect ratio of 4 to 70 could satisfy all the phases such as fluidity, formability or sintering property, and the solid lubricant and the grinding grains may be contained uniformly in large amounts. This is one of the characteristics of the invention.

If the aspect ratio (length (l))/thickness (d)) is less than 4, the fibers are too much near the flours and make point-contact with each other, so that the solid lubricant and the grinding grains could not be scattered much in spite of the high forming pressure. Conversely, if the aspect ratio is more than 70, the mixture with the solid lubricant and the grain is easily ill-balanced, and the fiber balls are formed, so that it is difficult to obtain a composite sliding material and a composite grinding material of good quality.

The fibers 2 of the aspect ratio between 4 and 70 are, in the absolute value, 15 to 50 μm of thickness (as diameter) and 150 to 300 μm of length. The producing conditions are determined from ranges of the natural vibration number of the tool: 2000 to 6000 Hz, the feed amount of the tool: 0.5 to 10 μm/rev, and the average cutting speed: 30 to 200 m/min. The elastic tool is secured with a cutting edge of cemented tip at a lateral portion under the main body thereof of L shape in side, and the upper part of the main body is secured to a holder with bolts via spacers. It is preferable that a rake angle of the cutting angle is zero or negative in view of easily causing the self-vibration and preventing pitching.

With respect to the vibration of the elastic tool, a displacing direction of the cutting edge is mainly a feed force direction, and it is a condition that amplitude of the vibration is larger than the feed of the tool, the cutting edge is non-contacted to the surface of the mother metal per 1 cycle of the vibration, and the loci of the cutting edge are equal in n times and n+1 times.

Preferable examples of the fibers are shown in Table 1, including the manufacturing conditions

TABLE 1

| A | B | C | D | G | H | I |
|---|---|---|---|---|---|---|
| 1 | 5000 | 80 | 1.2 | 20 | 200–400 | 10–20 |
| 2 | 5000 | 80 | 1.8 | 25 | 200–400 | 8–16 |
| 3 | 5000 | 100 | 2.1 | 30 | 200–400 | 6.6–13 |
| 4 | 5000 | 100 | 2.9 | 35 | 200–400 | 5.7–11.4 |
| 5 | 5000 | 120 | 3.2 | 40 | 200–400 | 5–10 |
| 6 | 5000 | 150 | 3.9 | 50 | 1500–3000 | 30–60 |

Note:
A - Test materials
B - Natural vibration number f (Hz)
C - Average cutting speed (m/min)
D - Feed (μm/rev)
G - Thickness of fiber (μm)
H - Length of fiber (μm)
I - Aspect ration (l/d)

The sintered composite material according to the invention is made as follows.

The specific fibers 2 having the aspect ratio of 4 to 70 and the powders 3 such as the solid lubricant or the grinding grains are charged into a bowl mill or other optional vessel, and agitated and mixed manually or mechanically.

Since the aspect ratio is appropriate, the fibers 2 are properly intertwined without forming lumps, and the powders are uniformly scattered in spite of the difference in the specific gravity. Thus, the satisfactorily mixed structure is made. As is seen in FIG. 8, at least one part of these elements are contacted to one another, and the lattices 10' of fine multi-layered net, and the powders 3 are filled into all of the spaces 4' (linked holes) of the net-like lattice.

If required, the combination of the fibers 2 and the powders 3 may be added with metal powders of the same nature as the fibers, for example, pure iron powders as carbonil for the fiber of cast iron.

The mixture 6 obtained in the pre-process is charged into a forming means, e.g., a metal mold 7 as in FIG. 9, and is pressed under a determined pressure. Since the matrix material is the fine and short fibers, the pressure at this time may be low in comparison with the case of the matrix of the powders. At the forming, distribution of the fibers 2 and space directions between the frame structure are right angled with the pressing direction, and they have required density, and the powders 3 are scattered uniformly in cross section of thickness.

As the forming process, a rolling practice may be used other than said charge and compression in the metal mold. Depending upon the rolling, the grinding material and sliding material of the sheet may be obtained.

Subsequently, the formed body is heated and sintered in a reducing atmosphere as hydrogen atmosphere or an inert atmosphere. By this sintering, the lattice of the net shape comprising the groups of the fine and short fibers is molten and adhered one another, and becomes a sintered structure of balanced nature as seen in FIG. 3 or 4, and in this structure the powders 3 are scattered.

Although a large quantity of the powders are much contained, the formed body can be sintered at the lower temperatures in comparison with the composite added under pressure with the metal powder for the matrix. A reason therefor is not always known, but since the fiber is directly produced from the mother material by the self-vibration machining, and the fibers are properly entwined due to the large surface area and the suitable aspect ratio, and they are efficiently molten and adhered.

Through the above mentioned process, the sliding material and the grinding material of the self-lubrication are provided. In the case of FIG. 2, it may be attached to the tool as it is and bristled. Of course, if required, it may be subjected to re-sintering after the first sintering and to a re-compression.

The sliding material of the self-lubrication is composed by adding the solid lubricant and the grinding grains to the fibers by the self-vibration machining of the aspect ratio between 4 and 70, and subjecting such mixture to the forming and the sintering. Therefore, the product is provided with the lattice of the multi-layered and fine net having the high porosity at the low forming pressure by means of entwining the fibers and line-contact, not point-contact as the powders. Between the lattices are the linked holes, and so the solid lubricant and the grinding grains may be uniformly greatly scattered therein.

Further, since the aspect ratio is proper, they may be charged easily into the forming means without making lumps, and the sintering after forming is carried out at lower temperatures than in the case of the powder matrix, though containing a great deal of the solid lubricant materials and the grinding grains.

By sintering, the lattice of the fine net including the solid lubricant and the grinding grains are molten and adhered, and become the solidified mother material of high strength. Thus, the holding strength of the both elements is high, and in case of the grinding material, it does not reveal fractures by separation or dislocation of the grinding grains.

Since the formed body contains them uniformly and in large quantity, the lubricating and grinding effect are preferable. Especially if it is applied to the grinding material, and when the grinding grains at the surface layer drop out by abrasion, those in a subsequent layer appear and a required grinding efficiency is maintained for a long time.

Further, it is excellent in sintering, though it contains much the grinding grains, and the characteristics as the good tensile strength and anti-shock are imparted. Besides, since it may be treated at the low sintering temperatures and when the diamond is used as the grinding grains, loss by graphitization is very little.

A further reference will be made to examples.

EXAMPLE 1

I. The sliding bearing of the self-lubrication was produced in accordance with the invention, and for comparison the sliding bearing was produced with the grains as the matrix.

As the mother metal, the cast irons of the compositions shown in Table 2 were used, and the fine and short fibers of Nos. 1 to 6 of Table 1 were produced by the self-vibration machining process. On the other hand, the cast irons were FC 15 grade of Table 2 and ground into #120. The solid lubricant was graphite sold in the market.

TABLE 2

|  | J | TC | Si | Mn | P | S | Cr | Mg | Ti | Cu |
|---|---|----|----|----|---|---|----|----|----|----|
| F | K | 3.18 | 1.75 | 0.81 | 0.070 | 0.036 | 0.034 | — | — | — |
| P | L | 3.18 | 1.75 | 0.81 | 0.070 | 0.036 | 0.034 | — | — | — |
| E | M | 3.31 | 2.89 | 0.39 | 0.069 | 0.015 | — | — | 0.165 | — |
| DF | N | 3.54 | 2.87 | 0.19 | 0.039 | 0.009 | — | 0.015 | — | — |
| DP | O | 3.27 | 2.43 | 0.80 | 0.095 | 0.005 | — | 0.065 | — | 0.43 |
| Cast | Q | 3.55 | 2.68 | 0.50 | 0.080 | 0.070 | — | — | — | — |

Note:
J - Mother casts
K - Ferrite graphite
L - Perlite graphite
M - Eutectic graphite
N - Ferrite ball graphite
O - Perlite ball graphite
Q - FC 15 grade cast iron II. The above materix materials were charged into the vessels and added with graphites 10 to 50 wt% and agitated mechanically for around 10 minutes. Forming was carried out under pressure of 60 Kg/mm$^2$, and the heating and sintering were performed in the hydrogen current at the sintering temperature of 1140° C. for 30 min.

III. Test pieces for tensile strength were made from the above obtained sliding bearing, and results of the tensile strength tests are as shown in FIG. 10. The invention showed the tensile strength of around 3 Kg/mm$^2$ with addition of graphite 20 wt%, and the tensile strength of 0.5 Kg/mm$^2$ with addition of graphite 50 wt% (77 vol%). On the other hand, when the cast iron powder (KIP) was used, the product was formed somehow with the addition 20 wt% thereof, but the sintering was not obtained, and the product was not formed with addition of more than 30 wt%.

IV. The invention used, as the matrix material, the fibers having the excellent characteristics by the self-vibration machining. Since the aspect ratio was appropriate, the mixture of the fiber was uniform, though the specific gravity was different three times, and the formability and the sintering property were well conditioned. For investigating it, the relation between the sintering temperature and the tensile strength when the forming was carried out at the surface pressure of 80 Kg/mm$^2$, was observed. As seen in FIG. 12, the cast iron powder had to be sintered at the temperature of 1110° C., and the maximum tensile strength was around 42 Kg/mm$^2$. In the invention, although the matrix material of the same composition was used, the strength of 25 to 30 Kg/mm$^2$ was obtained by sintering at a temperature of 950° C.

FIG. 13 shows the influence on the tensile strength by the sintering temperature of 1140° C., the sintering time of 30 min and the forming pressure of 20 to 80 Kg/mm$^2$. As is seen from the same, the invention obtained the tensile strength of 20 Kg/mm$^2$ by the forming pressure as low as 20 Kg/mm$^2$.

V. The sliding bearing was used under the conditions of the load more than 300 Kg/cm$^2$ and the speed beyond 50 m/min, and the satisfactory lubrication and durability were obtained in that the sliding directions were desirous in sliding and rotation.

EXAMPLE 2

The test materials Nos. 1 to 6 were prepared with bronze, and the sliding bearings were obtained by mixing graphite powders and sintering them. When the bearings were formed with the fibers only, the porocity was 80% under the forming pressure of 140 Kg/cm$^2$ and it was 20% under the pressure of 5000 Kg/cm$^2$. When the graphite was added 50 wt% and the sintering was performed at the temperature of 810° C., the bearing of the tensile strength of about 3 Kg/mm$^2$ was obtained.

The same results were brought about to brass and aluminium alloy.

EXAMPLE 3

I. The grinder was produced by this invention, and for comparison the grinder was produced with the powders of the bonding agent.

The fibers were produced from the five kinds of the mother materials of the cast irons shown in Table 2 of Example 1, by the self-vibration machining under the conditions shown in Table 1. The powders for comparison were FC15 grade cast iron which was ground into #120. The grinding grains were alumina (WA#800).

II. The above mentioned fibers were added with grinding grains 10 to 50 wt%, and formed with a rectangular die of 10 mm×50 mm under the surface pressure of 60 Kg/mm$^2$, and sintered at the temperature of 1140° C. for 10 min.

FIG. 11 shows the tensile strength and density of the obtained grinder in comparison with the bonding agent of the powders (cast). In the invention, the tensile strength was 18 Kg/mm$^2$ though the ground grains were added 10 wt%, and the sintering was possible though the ground grains were added 50 wt% (70 vol%), and the tensile strength was 2 Kg/mm$^2$. On the other hand, in the powders (cast), the forming was impossible with addition of the ground grains more than 30 wt%, and the forming was possible with 20% addition but the sintering was not provided.

III. For testing the above characteristics, the sintering was carried out under the forming pressure of 80 Kg/mm$^2$ constant, for the sintering time of 30 min and at the sintering temperature of 950° to 1150° C. The results were almost the same as in FIG. 12 of Example 1. That is, in the powder, when the sintered grinder was used, a further sintering at the temperatures of more than 1100° C. was required. The maximum tensile strength was 42 Kg/mm$^2$. In the invention, the tensile strength was 25 to 30 Kg/mm$^2$ by sintering at the temperature of 950° C. in spite of little difference in the composition. It was seen from this fact that the invention was very useful when the diamond was used as the grinding grains.

The further investigation was made to the influence to the tensile strength when the sintering temperature was 1140° C. constant, the time was 30 min constant and the forming pressure was 20 to 80 Kg/mm$^2$. The results were almost the same as in FIG. 13 of Example 1. That is, in the invention, the tensile strength was 20 to 30 Kg/mm$^2$, though the forming pressure was as low as 20 Kg/mm$^2$, and the formability was excellent.

IV. The obtained grinder (grinding grains 30 wt%) was used as the lapping tool, and the experiment was made under the conditions of cemented carbide as a material to be processed, the processing speed of 16 to 60 m/min, and the processing pressure of 0.5 to 15 Kg f/cm. The lapping amount was not reduced for a long period of time and the satisfactory durability was revealed. The lapping efficiency and roughness on the surface were desirable.

INDUSTRIAL APPLICATION

The sintered composite material with the matrix of the short metal fibers may be used to the bearing of the self-lubrication, bush, planking or shoe for moving materials of heavy weight, lapping finish, super finish, grinding tools, grinder, or other processes of different processing as the grinding tools of the metal molds or cast iron products.

What is claimed is:

1. A sintered composite material, comprising a sintered body, said sintered body including a mixture of fine short fibers which form a matrix and non-metallic powder grounds grains, said fine short fibers being produced from a base material by a self-excited vibration of an elastic machining tool having a natural vibration number of 2000 to 6000 Hz, a feed amount of 0.5–10 μm/rev, and an average machining speed of 30–200 m/min., said fibers having an axial line transverse with a machining direction, a thickness between 15 and 50 μm, an aspect ratio between 4 and 70 and a cross sectional area being a triangle and comprising a smooth face, a broken face and a rough face, and said fibers forming three dimensional net worked fine lattice structures and being adhered at contact faces to thereby form one sintered and united body where said powder grounds grains are scattered and enveloped.

2. A sintered composite material as defined in claim 1, wherein said grounds grains are composed of a solid lubricant.

3. A sintered composite material as defined in claim 1, wherein said ground grains are formed as grains for grinding.

4. A sintered composite material as defined in claim 1, wherein said ground grains of said mixture have a smaller size that said fine short fibers.

5. A sintered composite material as defined in claim 1, wherein said fine short fibers are metal fibers.

6. A sintered composite material, comprising a sintered body, said sintered body including a mixture of fine short cast iron fibers which form a cast iron matrix and non-metallic powder grounds grains, said fine short fibers being produced from a base material by a self-excited vibration of an elastic machining tool having a natural vibration number of 2000 to 6000 Hz, a feed amount of 0.5–10 μm/rev, and an average machining speed of 30–2000 m/min., said fibers having an axial line transverse with a machining direction, a thickness between 15 and 50 μm, an aspect ratio between 4 and 70 and a cross sectional area being a triangle and comprising a smooth face, a broken face and a rough face, and said fibers forming three dimensional net worked fine lattice structures and being adhered at contact faces to thereby form one sintered and united body where said powder grounds grains are scattered and enveloped.

7. A method of producing a sintered composite material, comprising the steps of producing fine short fibers from a base material by a self-excited vibration by a self-excited vibration of an elastic machining tool having a natural vibration number of 2000 to 6000 Hz, a feed amount of 0.5–10 μm/rev, an average speed of 30–200 m/min., said fibers having an axial line transverse with a machining direction, a thickness between 15 and 50 μm, an aspect ratio between 4 and 70 and a cross sectional area being a triangle and comprising a smooth face, a broken face and a rough face; mixing said fine short fibers which form a matrix, with non-metallic powder ground grains so that fibers form three dimensional net worked fine lattice structures where said powder grounds grains are scattered and enveloped; and sintering said mixture so that said fine short fibers adhere at contact faces to form a sintered and united body with the adhered fibers and the powder grounds grains scattered and enveloped in the three dimensional net worked fine lattice structures.

* * * * *